Patented Jan. 19, 1943

2,308,696

UNITED STATES PATENT OFFICE 2,308,696

WATER INSOLUBLE RESINOUS CONDENSATION PRODUCTS OF SEMICARBAZIDE WITH FORMALDEHYDE

Frederick L. Johnston, Claymont, Del., assignor to E. I. du Pont de Nemours & Company, Wilmington, Del., a corporation of Delaware No Drawing. Application August 14, 1940,
Serial No. 352,617

7 Claims. (Cl. 260—72)

This invention relates to new polymeric materials and more particularly to new resins prepared from formaldehyde and nitrogen-containing carbonyl compounds.

It has long been known in the art to react semicarbazide ($NH_2$—CO—NH—$NH_2$) or more frequently semicarbazide-hydrochloride

($NH_2$—CO—NH—$NH_2$.HCl)

with aldehydes and ketones to prepare crystalline monomeric aldehyde and ketone derivatives for purposes of identification of the original aldehyde or ketone. (See Shriner and Fuson—Identification of Organic Compounds—Wiley, 1935, p. 145; Whitmore—Organic Chemistry—Van Nostrand, 1937, pp. 241, 258.) However, it is further known that semicarbazide and formaldehyde do not react directly to yield a normal semicarbazone. (Hess, Uibrig, Eichel, Berichte, 50, 344–51 (1917); J. Chem. Soc. 112, I, 351; Thiele and Bailey, Ann. 303, 91, 1898.) The only direct reaction product from semicarbazide and formaldehyde hitherto known is an amorphous, insoluble compound formed by the condensation of 2 molecules of semicarbazide with 3 molecules of formaldehyde with the loss of 3 molecules of water to form a compound $C_5H_{10}N_6O_2$ (Michael, J. Am. Chem. Soc. 41, 393–424 (1919); also, see Thiele and Bailey above). This compound was prepared by condensing semicarbazide hydrochloride with formaldehyde in an acid medium. The material is insoluble and infusible and not at all resinous in character.

This invention has as an object the provision of a process for the preparation of glass-clear, colorless, resinous materials characterized by exceptional hardness and scratch resistance from semicarbazide and formaldehyde. Another object is the preparation of new coating and molding compositions. Other objects will appear hereinafter.

These objects are accomplished by the following invention wherein semicarbazide is reacted with formaldehyde in aqueous solution at a pH of at least 5 and preferably of 7 to 9.

The condensation of semicarbazide with formaldehyde may be largely controlled by a regulation of the pH of the aqueous medium in which the condensation takes place. Thus in a strongly acid medium (pH 5 or less) the compound of Thiele and Bailey, etc., (see above) is formed. In a slightly acid or neutral medium (pH 5 to 7) semicarbazide and formaldehyde condense spontaneously with the evolution of heat to yield the resin of this invention. In an alkaline medium especially in the range of pH 7 to pH 9, condensation to a resin proceeds relatively slowly and may readily be controlled since under these conditions the progress of the condensation is almost directly proportional to the amount of heat supplied. By operating in this latter range it is possible to prepare condensates which are soluble in organic solvents and are thus useful in preparing coating compositions. It is preferred to avoid strongly alkaline media such as those above pH 9 due to the tendency of semicarbazide to decompose under these conditions with a resulting decrease in yield of the product.

In the preferred embodiment of this invention free semicarbazide is dissolved in aqueous formaldehyde, the pH of the solution being at least 5 and preferably 7 to 9, and the condensation allowed to proceed with or without heating until the desired degree of reaction has taken place, whereupon the resulting product is treated by suitable means such as by distillation with or without the use of reduced pressure or by exposing to the air with or without the application of heat to bring about dehydration to yield the finished product.

If the product to be prepared is a solid molded article, the above process is carried out in a suitable container until the dehydration process is essentially complete. Then the resulting solid mass may be removed, ground to a powder, mixed or not as desired with suitable pigments, fillers, or other coloring materials and molded under heat and pressure in a die suitably a little larger than the desired finished article. During this molding operation the product becomes infusible and insoluble in water and organic solvents.

If it is desired to prepare a coating composition of the resin of this invention, the formaldehyde solution is first preferably rendered neutral or slightly alkaline by addition of caustic. After the addition of the semicarbazide a suitable water soluble organic solvent such as butanol, isobutanol, acetone, etc., is added either at once or in any event before the condensation has proceeded to an insoluble stage. The water is removed by distilling either at atmospheric or reduced pressure. During this operation some of the organic solvent is also removed and may be suitably replaced. The resulting viscous solution may be used directly as an air drying or baking coating composition or combined with pigments, drying oils, driers, thinners, etc., in the customary manner of preparing paints and varnishes from coating composition bases.

The formaldehyde may be supplied as an aque ous solution such as the 37 per cent formalin of commerce, as gaseous or liquid free formaldehyde, as paraformaldehyde, as trioxane, or any other condensed formaldehyde capable of releasing free formaldehyde under the reaction conditions.

In carrying out this invention it is preferred to use free semicarbazide. Semicarbazide salt complexes such as the hydrochloride and the sulfate may be used, but this greatly reduces the yield of polymeric material owing to the necessity of neutralizing the acid of the complex with alkali. Also, when these salt complexes are used, it is difficult to stop the reaction in a soluble stage, and the final product is frequently contaminated by the salt formed in the neutralization process.

The more detailed practice of the invention is illustrated by the following examples, wherein parts given are by weight. There are of course many forms of the invention other than these specific embodiments.

Example I

Twenty parts of free semicarbazide and 80 parts of 37 per cent formaldehyde (commercial formalin) are mixed together in a suitable container. The reaction mixture has a pH of about 6. The semicarbazide dissolves almost at once. Within one minute there is a noticeable evolution of heat, and after two minutes the mixture begins to increase in viscosity. Within five minutes the mixture sets to a hazy, opalescent gel, and the evolution of heat diminishes. The gel is removed from the container and dehydrated by allowing to stand in the air for several days or, more rapidly, by storing under reduced pressure at room temperature for several hours. The dehydrated polymer is a brilliantly glass clear solid which is exceptionally hard and scratch resistant.

Example II

Twenty parts of semicarbazide is dissolved in 80 parts of formaldehyde and the solution brought to a pH of about 8 by the addition of NaOH. This solution is heated to boiling, and 200 parts of isobutanol are added. This produces a 2-phase system. Further boiling with volatilization of water yields a 1-phase system. At the end of one hour of boiling there remains a viscous solution of the semicarbazide-formaldehyde condensate in isobutanol.

Paper is rendered more water resistant and mar resistant when dipped in the above solution, drained, and baked at 125° C. for one hour. This is due to impregnation and coating by the very hard resin.

A film of the above solution flowed on glass and baked at 125° C. for one hour yields a glass clear, colorless coating of exceptional hardness.

A portion of the above solution is mixed with an isobutanol solution containing a quantity of a 55 per cent castor oil modified alkyd resin equal to the quantity of solid polymer present in the above solution. Coatings of this composition flowed on glass and baked at 125° C. for one hour are hard and flexible.

The solution prepared according to the above example may be evaporated to dryness or treated with a non-solvent for the resin (such as excess water) to coagulate the resin. The partially condensed product so obtained may be used as a molding powder with or without addition of suitable fillers and/or coloring materials, being heated under pressure preferably at temperatures in the range of 100 to 125° C. until dehydration is substantially complete to yield exceptionally hard and durable articles which are faithful reproductions of the cavity of the mold in both shape and surface characteristics.

The resins of this invention may be dissolved in aqueous solutions of mineral acids. The resins may be deposited from such solutions by volatilization when acids such as HCl or $HNO_3$ are used.

If it is desired to produce a softer, more flexible product, a suitable plasticizer such as a substantially non-volatile organic liquid, i. e., tricresyl phosphate, dibutyl phthalate, castor oil, abietic acid esters or a plasticizing type of soluble alkyd resin may be incorporated in the condensate either during or after the condensation.

This invention is useful for preparing new solid cast or molded resinous materials for mechanical or electrical applications and for preparing new and useful coating compositions.

The above description and examples are intended to be illustrative only. Any modification of or variation therefrom which conforms to the spirit of the invention is intended to be included within the scope of the claims.

What is claimed is:

1. A water-insoluble, completely aliphatic resinous product consisting essentially of the product of the condensation of formaldehyde with semicarbazide.

2. A solid water-insoluble, completely aliphatic resinous condensation product of formaldehyde with semicarbazide, the semicarbazide being essentially the sole amide component.

3. A solution of a water-insoluble, completely aliphatic resinous condensation product of formaldehyde and semicarbazide in a lower aliphatic alcohol.

4. A potentially reactive water-insoluble, completely aliphatic resinous condensation product of formaldehyde and semicarbazide, the latter being essentially the only amide component, said condensation product being capable of further condensation and of being set up by heat and pressure.

5. A molding powder comprising as an essential component a potentially reactive water-insoluble, completely aliphatic resinous condensation product of formaldehyde and semicarbazide, the latter being essentially the only amide component, said condensation product being capable of further condensation and of being set up by heat and pressure.

6. A process which comprises reacting formaldehyde with semicarbazide in solution at a pH of at least 5 and at most 9.

7. A process which comprises reacting formaldehyde with semicarbazide in solution at a pH of 7 to 9.

FREDERICK L. JOHNSTON.